United States Patent [19]

Monaco et al.

[11] 4,233,320
[45] Nov. 11, 1980

[54] METHOD FOR STERILIZING, HOMOGENIZING AND PACKAGING PROTEIN CONTAINING FOOD

[75] Inventors: José R. Monaco, Santiago, Chile; Hans A. Rausing, Lund, Sweden

[73] Assignee: Tetra Pak Developpement SA, Pully-Lausanne, Switzerland

[21] Appl. No.: 5,909

[22] Filed: Jan. 23, 1979

[30] Foreign Application Priority Data

Jan. 23, 1978 [SE] Sweden .................................. 7800776

[51] Int. Cl.³ .......................... A23B 4/00; A22C 25/20
[52] U.S. Cl. .......................................... 426/7; 426/92; 426/105; 426/129; 426/104; 426/574; 426/643; 426/399; 426/410; 426/414; 426/802
[58] Field of Search ............... 426/802, 643, 104, 646, 426/574, 515, 513, 399, 40 1, 413, 414, 59, 7, 92, 129, 392, 410, 412, 324, 325, 331, 105

[56] References Cited

U.S. PATENT DOCUMENTS

| | | | |
|---|---|---|---|
| 3,466,841 | 9/1969 | Rausing | 426/410 |
| 3,495,992 | 2/1970 | Defor | 426/413 X |
| 4,136,210 | 1/1979 | Noguchi et al. | 426/515 X |
| 4,176,202 | 11/1979 | Decker et al. | 426/643 X |

Primary Examiner—Steven L. Weinstein
Attorney, Agent, or Firm—Burns, Doane, Swecker & Mathis

[57] ABSTRACT

The invention relates to a method for the processing, sterilization and packaging of a food product starting from a raw material basically consisting of Krill, in order to obtain a protein rich food product with good taste, consistency, structure, preparing abilities and keeping properties. Said method includes the steps of breaking down the whole Krill into small particles, sterilization of the broken down Krill, cooling and grinding the sterilized product into liquid or semi-liquid form and packaging the liquid substance under aseptic conditions, whereby the liquid substance is solidified in the aseptic packages.

12 Claims, 1 Drawing Figure

U.S. Patent
Nov. 11, 1980
4,233,320
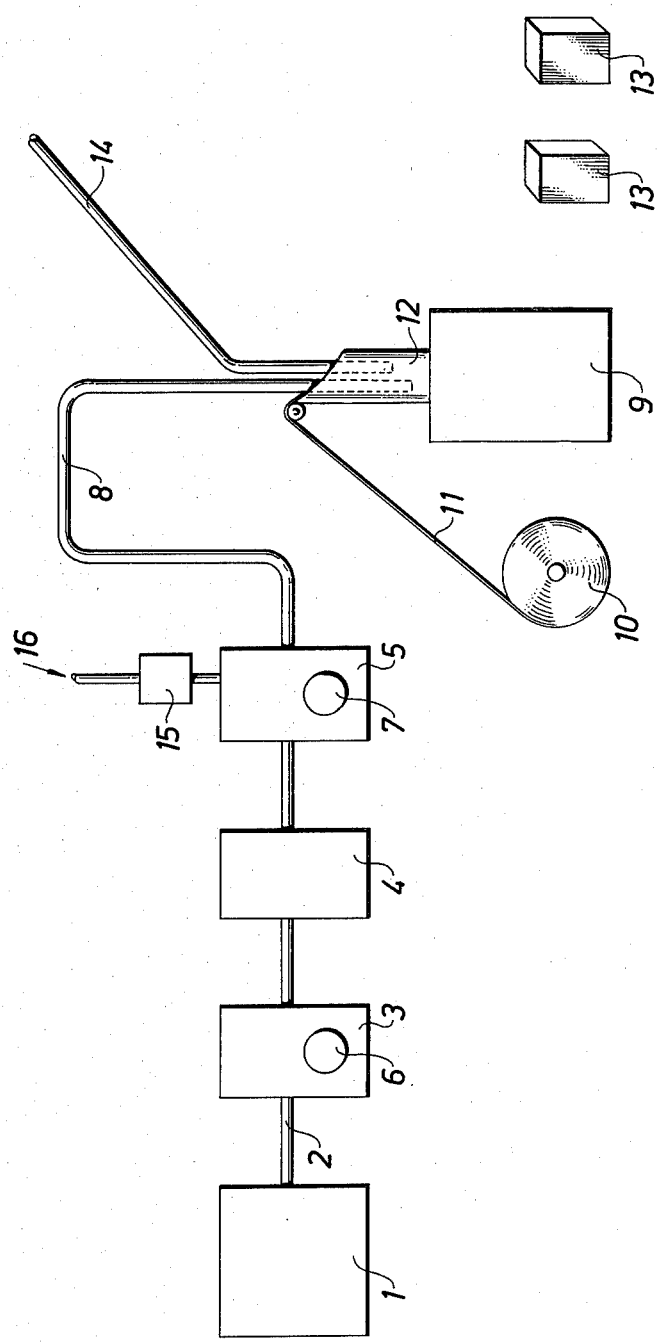

METHOD FOR STERILIZING, HOMOGENIZING AND PACKAGING PROTEIN CONTAINING FOOD

The present invention relates to a method for the treating and packaging of a food product for the purpose of obtaining good keeping properties for the product, and also a food product treated in accordance with the method.

A large part of the fish caught at present is fished by fishing boats which operate far out in the ocean and which collaborate with parent ships which are equipped with machines and arrangements for the cleaning, filleting and deep-freezing of fish and the manufacturing of tinned fish products. However, a large part of the fish caught is lost as fish-cleaning waste, and a considerable part of the catch is not utilized at all or is used for the manufacturing of animal fodder in the form of fish meal. Large quantities of so-called Krill (euphausiacea) which is a prawn or shrimp species of the family Crustacea, occurring in the ocean and particularly in arctic waters in enormously large schools, are caught among others. Krill is very rich in protein and a great part of the shortage of protein food which exists in the world could be remedied if the protein from Krill and fish could be utilized in a suitable manner. Beside Krill there is a potential catch of large quantities of mussles, cuttlefish and plankton which at present is not utilized. As mentioned above, it is known that fish or Krill can be converted to fish meal which is very rich in protein, but it has been difficult to use this fish meal for human foodstuffs, since among other things the taste is not sufficiently pleasing, so that the bulk of the fish meal is used for animal fodder instead.

Thus there is a great need for utilizing such protein sources as Krill and fish, which are not directly consumable, in the preparation of an inexpensive food containing protein which has good keeping properties and an acceptable taste. Such a food must be prepared, sterilized and packaged in bacteriaproof packages so as to obtain the keeping properties necessary for distribution such food to such places as the developing countries where a great shortage of high-protein food exists, but where there are no facilities for distribution and storing of the food in a cooled or frozen condition. It is known in packaging technology that sterilized milk can be packed by means of automatic packaging machines under aseptic conditions in bacteriaproof packages which are manufactured from a packing material consisting of plastic-covered paper. These packages are very inexpensive to manufacture and are light in weight, which means that the transportation costs remain low. The product which is to be packed by means of the automatic packaging machines mentioned above must be substantially liquid or semi-liquid, even if the product may contain small amounts of solid parts, and therefore it is necessary to process the product in such a way, that it will be liquid or semi-liquid before the packaging operation. Another problem is that the product packed should be solidified in the package and that this solidification should be "thermostable", which means that the product taken out from the package will not melt or otherwise be liquified when subjected to heat.

By using these known methods for the aseptic packaging of sterilized foodstuffs, many of the products which now go to waste, or which are used in an irrational manner, can be utilized for human nourishment in accordance with the method according to the invention, which is characterized in that (a) the raw product required for the foodstuff product is treated by mechanical and/or chemical means and broken down to particles whose size is smaller than 5 and preferably smaller than 1 mm, so as to form a substantially homogeneous fluid or semifluid product, (b) the said raw product is heated before, in connection with, or after the breaking-down process to such an extent that the product becomes sterile and that the proteins of the product are at least partly made to coagulate, (c) the product which is at least partly coagulated is cooled to a temperature below the coagulating temperature, and is processed and homogenized and broken down thereafter under aseptic conditions to fluid or semifluid form, (d) the sterilized product is packed under aseptic conditions into bacteriaproof packages wherein the product is made to thicken to semisolid or solid form by means of coagulating agents or water-absorbing organic compounds contained in the product or specially added to it.

The invention will be described in greater detail with reference to the enclosed schematic drawing which shows a process diagram for the realization of the invention. In the process diagram a collecting or mixing tank is marked 1, an arrangement for fine distribution (grinding) and homogenization of the raw material is marked 3 and a pipeline between the mixing or collecting tank 1 and the homogenizing arrangement 3 is marked by reference numeral 2. Furthermore, numeral 4 refers to a heat sterilizer, numeral 5 to a homogenizing and grinding arrangement and numeral 9 to a packing machine. The homogenizing arrangements 3 and 5 in the case illustrated are provided with mechanical fine distribution arrangement mills 6 and 7 respectively, and the packing machine 9 has a magazine roll 10 of packing material, from which a web 11 is rolled off and formed to a tube 12, which tube is sterilized and thereafter filled with contents from the filler pipe 8 and 14 respectively, and is sealed and moulded so as to form closed bacteria-tight packing containers 13.

It is the intention that the process equipment shown in the figure should be placed aboard the parent vessels mentioned earlier, which follow and serve a large number of fishing boats, the raw products which are to be treated being delivered continuously to the mixing tank 1. It is however possible that the Krill or fish caught aboard the fishing boats is frozen and transported ashore where the processing and packaging facilities are located. The raw products may consist e.g. of Krill, which is caught in large quantities, but it is also conceivable that as a raw product whole prawns or parts thereof may be used. Other possible raw products include cleaned or uncleaned fish which for one reason or another has not been used for deep-freezing or tinning, fish-cleaning waste, especially from lean, filleted fish, cuttlefish, mussles, etc., various species of plankton and other unicellular animals and edible algae and, if desired, greens and, in order to give a suitable taste to the product, brine and spices of different kinds, e.g. saffron. Preferbly, however, the process described is intended to be run with Krill as the raw material, and one essential advantage that the Krill as raw material is that the whole animal can be utilized, which makes it unnecessary to rinse or peel the Krill. The shell and the skeleton of the Krill can ge ground into colloidal form and the eyes of the Krill contains a red colouring substance, which will give the product a nice, pink colour.

From the mixing tank 1 the raw product, which in the preferred embodiment of the invention is mainly Krill together with some salted water, is transferred through a relatively thick pipe 2 to a homogenizing chamber 3, wherein the raw products are mechanically processed and broken down to smaller pieces which do not exceed 5 mm in size and preferably not 1 mm in size, and it will be especially preferred in some cases to grind the Krill into colloidal form (less than 100 Å). In certain cases it may be appropriate, beside the mechanical processing, to break the material down by chemical (enzymatic) means, and in this case a suitable enzyme is added to the mixing tank. In the homogenizing chamber 3 the product is converted to a fluid or a semifluid mass which can be conditioned in different ways. To improve the sterilization result it is possible, for example, to add an acid substance if the pH value of the mixture is too high, and an acid substance is then added to such an extent that the pH value of the mixture is lowered to 7 or less. It is also conceivable that the pH value of the mixture may be too low, and in this case the mixture is conditioned in that a basic substance is added. It is also appropriate, immediately prior to the heat treatment of the homogenized mass, to add a water-absorbing carbohydrate, e.g. coarsely ground rice, the carbohydrate being added in the process such that it cannot absorb liquid to its full capacity before the actual packaging.

The raw product thus homogenized and conditioned is introduced into a sterilizer 4, wherein the fluid or semifluid product is heated to a temperature exceeding 120° C. and preferably 140° C. for at least 4-8 seconds, and in some apparatus up to 30-50 seconds. To achieve full sterility it is important that all parts of the product are heated to sufficiently high temperature for a sufficiently long period, which means that the length of the treatment has to be adapted to the size of the individual particles in the fluid or semifluid product, and therefore the time for the treatment may be varied between 4 and 60 seconds.

During the heat treatment, besides sterilization of the product, a coagulation of proteins present in the product also takes place which causes the product to obtain wholly or partly a more solid consistency after the heat treatment.

As it is desired that the product should be fluid or semifluid in connection with the packing operation, the sterilized product is passed to a new homogenizer 5, wherein the product under aseptic conditions is subjected to a mechanical homogenization treatment so that it becomes fluid or semifluid, and the particles ground to colloidal size, thereupon the product is passed through the pipeline 8 to the packing machine. If the product before the sterilization operation has been conditioned through addition of an acid substance to lower the pH value of the product, the pH value can, before the actual packaging, be increased again through the addition of a basic substance which can promote the coagulation of the product after the packaging. In the packing machine a web of plastic-covered paper, which is rolled off a magazine roll 10, is converted to a tube in that the longitudinal edges of the web are joined together through the welding together of the plastic coverings of the edge regions facing one another with the help of heat and pressure. The tube 12 formed is sterilized internally in that a chemical sterilizing agent, e.g. hydrogen peroxide, is applied to the web 11 in advance, and is then heated and vaporized through heating of the inner walls of the tube 12 by a radiation element which is introduced inside the tube. By the combined effect of heat and hydrogen peroxide all bacteria are killed on the packing material along the inside of the tube 12, whereupon the sterilized product, which is introduced through the pipe 8, is filled into the tube, which is then sealed off by means of pressure and heat along successive narrow seals transverse to the longitudinal axis of the tube so that the sterilized product is enclosed in the sterilized package in a bacteriaproof manner. The tube portions separated by means of the transverse seal can then be severed from the rest of the tube by cutting through the sealing region, whereupon the said severed tube portions can be moulded to form e.g. parallellepipedic or tetrahedric packing containers 13. If it is desired for the packed product to contain larger pieces of e.g. fish, such fish pieces may be sterilized separately and then added to the tube 13 in portions through the separate filler pipe 14, and be portioned out so that a suitable quantity of fish pieces will be located in each packing unit.

The packing containers 13 contain a fluid or semifluid product which, during the storage period thickens to assume a semisolid or solid consistency, a certain gas content in the semifluid product bringing about a certain bubble formation in the solid product. The change in consistency may occur due to the liquid-absorbing organic compounds, e.g. coarsely ground rice, which take up moisture with simultaneous swelling, and at the same time the protein of the product coagulates again. For a further increase of the solidity of the packed product, special coagulating substances, e.g. gelatine, may be added. However, if they are added after the sterilizing operation such coagulating substances must be sterilized separately to avoid the contents of the packages becoming infected.

The packages 13 contain a high-protein product, with an agreeable taste due to the seasoning, which may be kept for a number of months, during which time the product, owing to the effect of the above-mentioned coagulating agents and carbohydrates, thickens in its package to form a solid or semisolid mass. The time it takes for the semifluid product to stiffen in the package depends on a number of factors, e.g. the natural coagulation of the product, the quantity of liquid-absorbing carbohydrates etc, but as an approximate value 2 hours-3 days may be quoted. Thus it is possible to keep and transport the sterilized and aseptically packed product in its package, without requiring any special cooling, which means that the product, which is inexpensive and very rich in protein, can be used in developing countries a long time after the actual packaging, whilst the preparation and packaging of the product can take place immediately as the raw product becomes available. The raw product mentioned earlier, which e.g. may consist of Krill, does not, as measured above, have to be prepared in fresh condition immediately after the catch, but it is conceivable that the raw product can be heat-treated separately or else deep-frozen for later utilization according to the invention.

It is to be noted that the most important characteristics of the sterile food product produced and packed are
 (a) the taste,
 (b) the colour,
 (c) the consistency and structure, and
 (d) the preparing ability (e.g. the heat resistance).

(a) The taste can be varied and improved within relatively wide limits, by means of spices and other flavouring substances added. If, however, the raw material has a "basic" dominant taste of e.g. bitterness, it will be difficult to remove such a dominant taste. The Krill has no such dominant taste and therefore it is normally easy to give the desired flavour to a food product based upon Krill. It is to be noted that the whole Krill including shell, head, etc., can be used without difficulties regarding the taste of the food product prepared.

(b) The colour of a food product of the kind described is very important, and it is known that fish product of different kinds mostly are white or at least very "pale". Other kind of raw material like normal prawns or shrimp will give a brownish product, which mostly is considered to be far too dark.

The colour of the food product can of course be improved by means of artifical colouring, but as artificial colouring of foodstuffs is prohibited in some countries and under discussion in other countries, it is preferable if the artificial colouring can be avoided.

The Krill prepared in accordance with the invention will give the product a pleasant pink colour which emanates from a natural colour substance in the eyes of the Krill. The colour of the product based upon "whole Krill" is consequently better than the product based upon the tails of the Krill only, as the pink colour mainly emanates from the eyes of the Krill.

(c) The consistency and structure of the product is very important and, as mentioned above, one of the problems solved by the invention is that the product has to be in liquid form during the packaging operation, but solidified when used. The consistency shall be such that the "form stability" of the product is maintained when the product is removed from the package and no longer supported by the walls of the package. In other words, the product shall coagulate "in the package" after the packaging process. This coagulation process is at least partly a natural process, as the proteins in the finely ground product have a natural tendency to adhere to each other (coagulate) when the product is coming to rest in the package after the packaging process. This coagulation process can be accelerated and amplified by means of additives like gelatine or hygroscopic materials like rice meal or other water-absorbing canbohydrates. The Krill contains a sufficient amount of proteins for coagulating the product in such a way that the product will be solidified without additives of the kind mentioned, but such additives might be added in order to improve the consistency.

The structure or the texture of the product can be improved by introducing small gas bubbles in the liquid or semiliquid product which gas bubbles will give the solidified product a quenelle-like "fleshy" structure. Those gas bubbles mentioned can be formed in the product if the product will emit gas during the solidification process, but a better method to obtain the "gas bubble structure" desired is to add a gas (sterilized gas) to the homogenizer and grinding means 7 through the pipe 16, which contains a sterile filter 15. In the homogenizer 7 the gas introduced is thoroughly mixed with the product, which is liquified in the homogenizer. The gas will be distributed in the product as small bubbles and partly be solved in the water which is set free when the Krill is ground into colloidal particles. When the liquid or semiliquid product is packed the gas bubbles will be trapped in the product when this is solidified and the quenelle-like structure is obtained. It is possible to use air as the gas for mixing with the product, but it is also possible to use other kinds of gases like nitrogen or carbon dioxide.

(d) The preparing ability is partly linked with the other characteristics mentioned above as the colour, taste etc., shall not be deteriorated when the product is cooked, fried or prepared in any other way.

One important ability in this respect is the so-called "thermostability" or "heat resistance". It is pointed out that it is important that the consistency of the product be stable which means that the product shall be able to be heated without melting. In other words, the "Krill patty" should not melt or flow out in the frying pan when prepared. If the solidification of the product solely is based upon gelatine or similar additives, the product will melt when subjected to heat, while a natural coagulation of the proteins and even a solidification by means of water-absorbants will give a heat-stable product which can be cooked and fried without melting and, as mentioned above, the finely ground Krill will have a sufficient content of proteins for coagulation.

Consequently, the Krill is a raw material which will fulfill all the requirements mentioned above, and as the Krill easily can be caught in enormous quantities and since it is not necessary to rinse or peel the Krill in any way, it is easy to understand that the Krill is a valuable, and inexpensive raw material and that the product in accordance with the invention is inexpensive, nutritious, acceptable with regard to taste, consistency, structure and colour, and highly available as the packages are aseptic which means that the product will keep fresh for months in an unopened package without any cooling storage.

It is possible to modify the method in accordance with the invention in such a way, that the packages which are filled and closed are heated together with the contents of the packages after the packaging procedure. Such a "post packaging" heat treatment can be a complete sterilization treatment (which means that the "prepackaging" heat treatment is superfluous), but it is also possible to restrict this heat treatment to initiate the coagulation process.

It was mentioned in the preamble that the Krill caught can be frozen and delivered to factories for performing the process in accordance with the invention, and it is of course also possible to have the "Krill patty" prepared in accordance with the invention in frozen blocks which are packed in a conventional way and stored and distributed as a deep-frozen product, but a number of the advantages will be lost if the Krill is prepared and distributed in such a way.

It is to be noted that the dry solid contents for the raw material used (preferably Krill) and the product packed and ready for consumption is the same, or about 25%. As the amount of additives is negligible, it can be claimed that the product packed is Krill in a reshaped and edible mode.

We claim:

1. A method for treating and packaging a food product containing proteins comprising:
   (a) providing a raw product containing proteins;
   (b) reducing the raw product to a plurality of particles having a size smaller than 5 mm. to change the raw product to a homogenous fluid or semifluid form;
   (c) sterilizing the raw product thereby at least partly causing the proteins to coagulate;

(d) cooling the at least partly coagulated sterilized raw product to below the coagulating temperature;

(e) homogenizing the cooled product to fluid or semi-fluid form; and (f) packing the sterilized, homogenized product under aseptic conditions into bacteriaproof packages and allowing the packed product to thicken to solid or semisolid form.

2. The method of claim 1 wherein the sterilizing step is performed at a temperature of at least 120° C. for at least 4–8 seconds.

3. The method of claim 1 wherein the reduced raw product is subjected to the action of a pH adjusting substance prior to the sterilization step.

4. The method of claim 1 wherein a thickening substance selected from the group consisting of coagulating agents and water-absorbing organic compounds is added to the raw product before packing.

5. The method of claim 4 wherein the thickening substance is rice.

6. The method of claim 1 wherein the raw product is selected from the group consisting of Krill, whole prawns or parts thereof, whole shrimp or parts thereof, cleaned fish, uncleaned fish, and fish cleaning waste.

7. The method of claim 6 wherein the packed product includes larger pieces of material selected from the group consisting of protein-rich material, carbohydrate-rich material and protein and carbohydrate-rich material.

8. The method of claim 1 wherein the reduction of the raw product is at least in part caused by biochemical action.

9. The method of claim 1 wherein the raw product is reduced to colloidal particle sizes.

10. The method of claim 1 wherein the sterilizing step is performed prior to the reducing step.

11. The method of claim 1 wherein the reducing and sterilizing steps are performed concurrently.

12. The packed product prepared in accordance with the method of claim 6 wherein the raw product is Krill.

* * * * *